(12) United States Patent
Bieser et al.

(10) Patent No.: US 6,214,924 B1
(45) Date of Patent: Apr. 10, 2001

(54) FILLED POLYETHYLENE COMPOSITIONS

(75) Inventors: John O. Bieser, Houston, TX (US); James R. Bethea, Baton Rouge, LA (US); Robert R. Turley, Lake Jackson, TX (US); Edwin R. Feig, Baton Rouge, LA (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/651,116

(22) Filed: Aug. 30, 2000

Related U.S. Application Data

(63) Continuation of application No. 09/030,330, filed on Feb. 25, 1998.

(60) Provisional application No. 60/039,586, filed on Feb. 28, 1997.

(51) Int. Cl.[7] .................................................. C08L 39/00
(52) U.S. Cl. ............................................................. 524/515
(58) Field of Search ........................................... 524/515

(56) References Cited

U.S. PATENT DOCUMENTS

| | | | |
|---|---|---|---|
| 3,203,921 | 8/1965 | Rosenfelder | 260/33.6 |
| 3,645,992 | 2/1972 | Elston | 260/80.78 |
| 3,904,456 | 9/1975 | Schwartz | 156/71 |
| 3,963,802 | 6/1976 | Shih | 260/873 |
| 4,012,547 | 3/1977 | Smedberg | 428/97 |
| 4,191,798 | 3/1980 | Schumacher et al. | 428/95 |
| 4,242,395 | 12/1980 | Zuckerman et al. | 428/96 |
| 4,263,196 | 4/1981 | Schumacker et al. | 260/33.6 |
| 4,335,034 | 6/1982 | Zuckerman et al. | 524/423 |
| 4,338,228 | 7/1982 | Inoue et al. | 524/120 |
| 4,379,190 | 4/1983 | Schenck | 428/95 |
| 4,395,519 | 7/1983 | Minami et al. | 525/240 |
| 4,403,007 | 9/1983 | Coughlin | 428/95 |
| 4,430,468 | 2/1984 | Schumacher | 524/109 |
| 4,434,261 | 2/1984 | Brugel et al. | 524/109 |
| 4,438,228 | 3/1984 | Schenck | 524/109 |
| 4,469,752 | 9/1984 | Yoshimura et al. | 428/475.8 |
| 4,525,257 | 6/1985 | Kurtz et al. | 204/159.2 |
| 4,613,632 | 9/1986 | Aliani et al. | 523/172 |
| 4,634,740 | 1/1987 | Fujita et al. | 525/240 |
| 4,734,328 | 3/1988 | Kohyama et al. | 428/336 |
| 4,748,206 | 5/1988 | Nogiwa et al. | 525/88 |
| 4,764,404 | 8/1988 | Genske et al. | 428/35 |
| 4,812,526 | 3/1989 | Rifi | 525/240 |
| 4,829,125 | 5/1989 | Yeo et al. | 525/194 |
| 4,843,129 | 6/1989 | Spenadel et al. | 525/240 |
| 4,847,317 | 7/1989 | Dokurno et al. | 524/424 |
| 5,011,719 | 4/1991 | Gehrke et al. | 428/35.7 |
| 5,011,891 | 4/1991 | Spenadel et al. | 525/211 |
| 5,030,506 | 7/1991 | Yamawaki et al. | 428/216 |
| 5,071,686 | 12/1991 | Genske et al. | 428/35.7 |
| 5,082,889 | 1/1992 | Koizumi et al. | 524/451 |
| 5,115,030 | 5/1992 | Tanaka et al. | 525/240 |
| 5,118,753 | 6/1992 | Hikasa et al. | 524/525 |
| 5,206,075 | 4/1993 | Hodgson, Jr. | 428/216 |
| 5,266,392 | 11/1993 | Land et al. | 428/224 |
| 5,268,220 | 12/1993 | Tajima et al. | 428/220 |

(List continued on next page.)

FOREIGN PATENT DOCUMENTS

| | | | |
|---|---|---|---|
| 684471 | 4/1964 | (CA) . | |
| 0 207 734 A2 | 1/1987 | (EP) | C08J/5/18 |
| 0 230 113 A2 | 7/1987 | (EP) | B32B/27/32 |
| 0 294 770 A2 | 12/1988 | (EP) | C08L/23/12 |
| 0 294 770 B1 | 10/1991 | (EP) | C08I/23/12 |
| 942363 | 4/1982 | (GB) . | |
| 1065568 | 1/1984 | (GB) | C08F/29/02 |
| 52-109580 | 9/1977 | (JP) | B32B/27/28 |
| 54-143362 | 11/1979 | (JP) | A43B/5/04 |
| 62-121709 | 6/1987 | (JP) | C08F/210/16 |
| 64-16848 | 1/1989 | (JP) | C08L/23/10 |
| 96/04419 | 2/1996 | (WO) | D06N/7/00 |
| 96/06132 | 2/1996 | (WO) | C08L/23/00 |
| 98/27143 | 6/1998 | (WO) | C08J/3/22 |

OTHER PUBLICATIONS

Abstract No. 73–67789U/45.
Abstract No. 78–39024A/22.
Abstract No. 68–98358P/00.
Abstract No. 68–94017P/00.
Abstract No. 68–93997P/00.
Abstract No. 68–87922P/00.
C. P. Rader, "Elastomeric alloy TPEs", *Modern Plastics Encyclopedia*, pp. 112, (1989).
C. D. Shedd, "Introduction to TPE's", *Modern Plastics Encyclopedia*, pp. 110, (1989).
T. W. Sheridan, "Engineering TPEs", *Modern Plastics Encyclopedia*, pp. 112, (1989).
C. S. Speed, "Structure/Property Relationships in Exxpol™ Polymers", Polyolefins VII International Conference, Feb. 24–27, (1991).
M. Jeffries, "The Marketing Challenge Created By Single Site Catalysts in Polyolefins", Proceedings of the First International Business Forum on Specialty Polyolefins SPO '91, Sep. 24–26, (1991).
M. Henewerk, et al., "New Specialty Linear Polymers (SLP) For Power Cables", Proceedings of the 1991 IEEE Power Engineering Society, Sep. 22–27, (1991).
D. Van der Sanden, "A new family of linear ethylene polymers provides enhanced sealing performance", *Tappi Journal*, pp. 99, Feb. (1992).
M. R. Rifi, et al., "Flexomer™ Polyolefins: A Bridge between Polyethylene and Rubbers", pp. 1–7.

*Primary Examiner*—Edward J. Cain

(57) ABSTRACT

The subject invention is directed to a polyethylene composition comprising from about 5 to about 70 weight percent of a homogeneous ethylene/α-olefin interpolymer, from about 30 to about 95 weight percent of at least one filler, and from about 0.1 weight percent to less than about 10 weight percent of at least one functionalized polyethylene. The polyethylene compositions of the present invention exhibit high tensile strength, high indentation resistance and filler holding capacity, and are especially useful for floor tile and sheeting applications.

21 Claims, No Drawings

U.S. PATENT DOCUMENTS

| | | | |
|---|---|---|---|
| 5,272,236 | 12/1993 | Lai et al. | 526/348.5 |
| 5,278,272 | 1/1994 | Lai et al. | 526/348.5 |
| 5,328,734 | 7/1994 | Morese-Seguela et al. | 428/36.92 |
| 5,358,792 | 10/1994 | Mehta et al. | 428/516 |
| 5,376,439 | 12/1994 | Hodgson et al. | 426/220 |
| 5,389,448 | 2/1995 | Schirmer et al. | 428/517 |
| 5,391,618 | 2/1995 | Yamamoto et al. | 525/88 |
| 5,414,040 | 5/1995 | McKay et al. | 524/576 |
| 5,416,148 | 5/1995 | Farah et al. | 524/409 |
| 5,468,808 | 11/1995 | Peacock | 525/240 |
| 5,484,838 | 1/1996 | Helms et al. | 524/496 |
| 5,571,864 | 11/1996 | Bates et al. | 525/88 |
| 5,576,374 | 11/1996 | Betso et al. | 524/451 |
| 5,639,816 | 6/1997 | Yamaguchi et al. | 524/451 |
| 5,639,829 | 6/1997 | Yamaguch et al. | 525/240 |
| 5,654,364 | 8/1997 | Bates et al. | 525/98 |
| 5,667,800 | 9/1997 | De Bringer | 424/450 |
| 5,945,472 | 8/1999 | Duong et al. | 524/425 |

FILLED POLYETHYLENE COMPOSITIONS

Cross-Reference to Related Applications

This is a continuation application of application Ser. No. 09/030,330 (42654A) filed Feb. 25, 1998, which itself claims the benefit of U.S. Provisional Application No. 60/039,586 filed Feb. 28, 1997.

This application claims the benefit of U.S. Provisional Application No. 60/039,586, filed Feb. 28, 1997.

FIELD OF THE INVENTION

The present invention relates to polyethylene compositions. In particular, the present invention relates to highly mineral filled polyethylene compositions.

BACKGROUND OF THE INVENTION

Heretofore, polyvinylchloride resin (a.k.a. PVC) has been commonly used as a base resin for resin compositions containing mineral filler, due to its ability to accept higher levels of such filler. For example, compositions comprising PVC and a mineral filler such as $SiO_2$, $BaSO_4$, and $CaCO_3$ has been used in floor tile and sheeting applications, due to the high impact strength, abrasion resistance and flexibility of PVC, coupled with the lost cost associated with increased filler loadings.

However, PVC has come under increased scrutiny for several reasons. For example, the presence of chloride atom in the backbone structure of PVC renders it difficult to re-melt, re-extrude, and recycle, and leads to poor heat stability. In addition, when combusted, PVC tends to disadvantageously release noxious substances, such as hydrochloric acid. Further, PVC typically contains a plasticizer to improve flexibility, which plasticizer may leach from landfilled PVC and cause soil and/or water pollution. PVC is further disadvantageous in that it is thermally sensitive, and thus requires tighter temperature control in molding processes than non-halogen containing polymers.

In view of the above deficiencies, industry would find advantage in a halogen-free PVC replacement which is more easily recyclable, but which does not sacrifice physical properties.

U.S. Pat. No. 4,847,317 (Dokurno et al.) discloses filled thermoplastic compositions comprising: (a) 30–90 parts ethylene polymer, (b) 10–70 parts graft modified ethylene polymer, and (c) 20–70 weight percent filler, based upon the amount of (a) and (b). Those in industry would find advantage in compositions which tolerate filler levels greater than 70 weight percent. Those in industry would further find advantage in compositions which achieve the desired performance, but which utilize less than 10 weight percent functionalized polyethylene, more preferably less than 3 weight percent functionalized polyethylene.

U.S. Pat. No. 4,379,190 (Schenck I) teaches filled thermoplastic compositions comprising: (a) 5–60 weight percent of a mixture of at least two copolymers of ethylene, having specified polar comonomer contents, (b) 40–90 weight percent filler, and (c) 0–15 weight percent plasticizer. When the filler is present in an amount exceeding 75 weight percent, Schenck requires that the plasticizer be present in an amount of at least 1 weight percent, with plasticizer levels between 3 and 10 weight percent being preferred, and with plasticizer levels between 4 and 8 weight percent being most preferred.

U.S. Pat. No. 4,403,007 (Coughlin) describes filled thermoplastic composition comprising: 5–55 weight percent of a copolymer of ethylene with a functionalized comonomer, 1–15 weight percent plasticizer, and 40–90 weight percent filler.

U.S. Pat. No. 4,438,228 (Schenck II) discloses a filled thermoplastic composition useful, e.g., as sound-deadening sheeting for automotive carpet, comprising: (a) 5–55 weight percent of an ethylene/a-olefin copolymer, (b) 2–12 weight percent plasticizer, and (c) 40–90 weight percent filler.

PCT Publication WO 96/04419 discloses the use of substantially linear ethylene polymers in sheet materials for flooring. While the PCT Publication recognizes the potential use of substantially linear ethylene polymers in sheet materials comprising up to 85 weight percent filler, it does not utilize greater than 65 weight percent filler in the Examples.

In contrast to the teaching of Schenck I, Schenck II, and Coughline, those in industry would further find advantage in a filled plasticizer-free thermoplastic composition, i.e., a thermoplastic composition containing less than 3 weight percent, especially less than 1 weight percent plasticizer.

However, the compositions of above references do not teach or disclose substantially halogen-free, highly filled, plasticizer-free polyethylene-based compositions achieving high flexibility.

SUMMARY OF THE INVENTION

One aspect of the present invention is a plasticizer-free polyethylene composition comprising:

(A) from about 5 weight percent to about 70 weight percent of at least one homogeneous ethylene/α-olefin interpolymer having:

(i) a density from about 0.85 $g/cm^3$ to about 0.92 $g/cm^3$, (ii) a molecular weight distribution ($M_w/M_n$) of less than about 3.5, (iii) a melt index ($I_2$) of from about 0.1 grams/10 minutes to about 175 grams/10 minutes, (iv) a CDBI of greater than about 50 percent;

(B) from about 30 weight percent to about 95 weight percent of at least one filler; and (C) from about 0.1 weight percent to less than about 10 weight percent of at least one functionalized polyethylene.

All percentages used herein are by weight based on the total formulation weight.

Preferably, the homogeneous ethylene/α-olefin interpolymer used in the polyethylene compositions of the present invention is a substantially linear ethylene polymer, more preferably a substantially linear interpolymer of ethylene and $C_3$–$C_{20}$ α-olefin.

The polyethylene compositions of the present invention may be usefully employed in floor tile and sheeting applications, due to their good abrasion resistance, indentation resistance, flexibility, impact strength and filler holding capability. Furthermore, the polyethylene compositions of the present invention are substantially halogen-free, and do not require the presence of plasticizer to achieve the stated advantages.

DETAILED DESCRIPTION OF THE INVENTION

The homogeneous ethylene/α-olefin useful in forming the polyethylene compositions of the present invention is a homogeneously branched interpolymer. That is, the α-olefin comonomer of the interpolymer is randomly distributed within each given interpolymer molecule such that substantially all of the interpolymer molecules have the same ethylene/comonomer ratio. The homogeneous ethylene/α-olefin interpolymers used for forming the polyethylene compositions of the present invention essentially lack a non-short chain branched polymer fraction which is measurable as "high density" fraction by the TREF technique.

The homogeneity of ethylene/α-olefin interpolymers is typically described by the SCBDI (Short Chain Branching Distribution Index) or CDBI (Composition Distribution Branch/Breadth Index) and is defined as the weight percent of the polymer molecules having a comonomer content with 50 percent of the median total molar comonomer content. The CDBI of a polymer is readily calculated form data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p 41 (1982), in U.S. Pat. No. 4,798,081 (Hazlitt et al.), in U.S. Pat. No. 5,008,204 (Stehling), in U.S. Pat. No. 5,246,783 (Spenadel et al.), in U.S. Pat. No. 5,322,728 (Davey et al.), in U.S. Pat. No. 4,798,081 (Hazlitt et al.), or in U.S. Pat. No. 5,089,321 (Chum et al.), the disclosures of all of which are incorporated herein by reference. The SCBDI or CDBI for the homogeneous ethylene/α-olefin interpolymers used for the polyethylene composition of the present invention is greater than about 50 percent, preferably greater than about 70 percent, especially greater than about 90 percent.

The density of the homogeneous ethylene/α-olefin interpolymer used for forming the composition of the present invention (as measured in accordance with ASTM D-792) is generally at least about 0.85 g/cm$^3$, preferably at least about 0.86 g/cm$^3$. The density of the homogeneous ethylene/α-olefin interpolymer is likewise typically less than about 0.95 g/cm$^3$, preferably less than about 0.92 g/cm$^3$, more preferably less than about 0.91 g/cm$^3$, and most preferably less than about 0.905 g/cm$^3$.

The molecular weight of homogeneous ethylene/α-olefin interpolymer useful in the polyethylene compositions of the present invention is conveniently indicated using melt index measurement according to ASTM D-1238, condition 190° C./2.16 kg (formerly known as "condition (E)", and also known as $I_2$). Melt index is inversely proportional to the molecular weight of the polymer, although the relationship is not linear. The melt index of the homogeneously branched ethylene/α-olefin interpolymer is generally at least about 0.1 grams/10 minutes (g/10 min.), preferably at least about 1 g/10 min. The melt index of the homogeneously branched ethylene/α-olefin interpolymer is typically less than about 175 g/10 min., preferably less than about 100 g/10 min.

Molecular Weight Distribution Determination

The homogeneous ethylene/α-olefin interpolymers may be analyzed for molecular weight distribution by gel permeation chromatography (GPC) on a Waters 150° C. high temperature chromatographic unit equipped with mixed porosity columns, operating at a system temperature of 140° C. The solvent is 1,2,4-trichlorobenzene, from which 0.3 percent by weight solutions of the samples are prepared for injection. The flow rate is 1.0 milliliters/minute, and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a * (M_{polystyrene})^b.$$

In this equation, a=0.4316 and b=1.0. Weight average molecular weight, $M_w$, and number average molecular weight, $M_n$, is calculated in the usual manner according to the following formula:

$M_j = (\Sigma w_i(M_i^j))_j$; where $w_i$ is the weight fraction of the molecules with molecular weight $M_i$ eluting from the GPC column in fraction i and j=1 when calculating $M_w$ and j=−1 when calculating $M_n$.

The molecular weight distribution ($M_w/M_n$) of the homogeneous ethylene/α-olefin interpolymer is less than about 3.5, preferably less than about 2.8, and is more preferably less than about 2.2. The molecular weight distribution ($M_w/M_n$) of the homogeneous ethylene/α-olefin interpolymer is typically at least about 1.8, preferably at least about 1.9. Most preferably, the molecular weight distribution ($M_w/M_n$) of the homogeneous ethylene/α-olefin interpolymer is about 2.

The homogeneous ethylene/α-olefin interpolymer may be a homogeneously branched linear polymer or a substantially linear polymer, with substantially linear polymers being preferred. Homogeneously branched linear ethylene/α-olefin interpolymers are described in U.S. Pat. No. 3,645,992 (Elston), the disclosure of which is incorporated herein by reference, and are commercially available from Exxon Chemical Company under the trademark Exact and from Mitsui Petrochemical Company under the trademark Tafmer. Substantially linear ethylene/α-olefin interpolymers are disclosed and claimed in U.S. Pat. No. 5,272,236 (Lai et al.) and U.S. Pat. No. 5,278,272 (Lai et al.), each of which is incorporated herein by reference in its entirety, and are available from The Dow Chemical Company under the trademark Affinity.

"Substantially linear" ethylene/α-olefin interpolymers are not "linear" polymer in the traditional sense of the term, as is used to describe linear low density polyethylene (Ziegler polymerized linear low density polyethylene (LLDPE)). Nor is the term "substantially linear" interpolymers used to describe highly branched polymers, such as low density polyethylene (LDPE).

Substantially linear ethylene/α-olefin interpolymers are characterized as having a backbone which is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons. Long chain branching is defined herein as a chain length of at least 6 carbons, above which the length cannot be distinguished using $^{13}$C nuclear magnetic resonance (NMR) spectroscopy. The long chain branch can be as long as about the same length as the length of the polymer backbone.

Long chain branching may be determined by $^{13}$C NMR spectroscopy and is quantified using the method of Randall (Rev. Macromol. Chem. Phys., C29 (2&3), p. 285–297), the disclosure of which is incorporated herein by reference.

As a practical matter, current $^{13}$C nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17, 1301 (1949)

and Rudin, A., Modern Methods of Polymer Characterization, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous SLEP samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$, Melt Index) as a function of Log(GPC Weight Average Molecular Weight) as determined by GPC-DV illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

For ethylene/α-olefin interpolymers, the long chain branch is longer than the short chain branch that results from the incorporation of the α-olefin(s) into the polymer backbone. The empirical effect of the presence of long chain branching in the substantial linear ethylene/α-olefin interpolymers used in the invention is manifested as enhanced rheological properties which are quantified and expressed herein in terms of gas extrusion rheometry (GER) results and/or melt flow, $I_{10}/I_2$, increases.

In contrast to the term "substantially linear", the term "linear" means that the polymer lacks measurable or demonstrable long chain branches, i.e., the polymer is substituted with an average of less than 0.01 long chain branch/1000 carbons.

SLEPs are further characterized as having:

(a) a melt flow ratio, $I_{10}/I_2 > 5.63$, (b) a molecular weight distribution, $M_w/M_n$ as determined by gel permeation chromatography and defined by the equation:

$(M_w/M_n) < (I_{10}/I_2) - 4.63$, (c) a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density within ten percent of the SLEP and wherein the respective critical shear rates of the SLEP and the linear ethylene polymer are measured at the same melt temperature using a gas extrusion rheometer, and (d) a single differential scanning calorimetry, DSC, melting peak between −30 and 150° C.

Determination of the critical shear rate and critical shear stress in regards to melt fracture as well as other rheology properties such as rheological processing index (PI), is performed using a gas extrusion rheometer (GER). The gas extrusion rheometer is described by M. Shida, R. N. Shroff and L. V. Cancio in Polymer Engineering Science, Vol. 17, No. 11, p. 770 (1977), and in "Rheometers for Molten Plastics" by John Dealy,published by Van Nostrand Reinhold Co. (1982) on pp. 97–99, both of which are incorporated by reference herein in their entirety. GER experiments are performed at a temperature of 190 C, at nitrogen pressures between 250 to 5500 psig using a 0.0754 mm diameter, 20:1 L/D die with an entrance angle of 180°. For the substantially linear ethylene polymers described herein, the PI is the apparent viscosity (in kpoise) of a material measured by GER at an apparent shear stress of $2.15 \times 10^6$ dyne/cm$^2$. The substantially linear ethylene polymers for use in the invention includes ethylene interpolymers and have a PI in the range of 0.01 kpoise to 50 kpoise, preferably 15 kpoise or less. The substantially linear ethylene polymers used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the substantially linear ethylene polymers.

The rheological behavior of substantially linear ethylene polymers can also be characterized by the Dow Rheology Index (DRI), which expresses a polymer's "normalized relaxation time as the result of long chain branching." (See, S. Lai and G. W. Knight ANTEC '93 Proceedings, INSITE™ Technology Polyolefins (SLEP)—New Rules in the Structure/Rheology Relationship of Ethylene α-olefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15, and are independent of melt index. In general, for low to medium pressure ethylene polymers (particularly at lower densities) DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$DRI = (3652879 * \tau_o^{1.00649}/\eta_o - 1)/10$ where $\tau_o$ is the characteristic relaxation time of the material and $\eta_o$ is the zero shear viscosity of the material. Both $\tau_o$ and $\eta_o$ are the "best fit" values to the Cross equation, i.e., $\eta/\eta_o = 1/(1+(\gamma^* \tau_o)^{1-n})$ in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190° C. Specific material determinations can be performed from 140 to 190° C. as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene polymers is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the substantially linear ethylene polymers, especially those having a density greater than 0.910 g/cm$^3$, used in the invention is greater than $4 \times 10^6$ dynes/cm$^2$.

Substantially linear ethylene polymers are known to have excellent processability, despite having a relatively narrow molecular weight distribution (i.e., the $M_w/M_n$ ratio is typically less than 2.5). Moreover, unlike homogeneously and heterogeneously branched linear ethylene polymers, the melt flow ratio ($I_{10}/I_2$) of substantially linear ethylene polymers can be varied independently of the molecular weight distribution, $M_w/M_n$. Accordingly, the polymer backbone (A) of the polymer compositions of the invention is preferably a substantially linear ethylene polymer.

The homogeneous ethylene/α-olefin interpolymer useful in forming the polyethylene composition of the present invention is typically an interpolymer of ethylene and at least one $C_3$–$C_{20}$ α-olefin and/or $C_4$–$C_{18}$ diolefin, is preferably an interpolymer of ethylene and at least one $C_3$–$C_{20}$ α-olefin, is more preferably a copolymer of ethylene and a $C_4$–$C_8$ α-olefin, and is most preferably a copolymer of ethylene and 1-octene. The term interpolymer is used herein to indicate a copolymer, or a terpolymer, or the like. That is, at least one other comonomer is polymerized with ethylene to make the interpolymer. Preferred comonomers include the $C_3$–$C_{20}$ α-olefins, especially propylene, isobutylene, 1-butene, 1-hexene, 4-methyl-1-pentene, 1-heptene, 1-octene, 1-nonene, and 1-decene, more preferably 1-butene, 1-hexene, 4-methyl-1-pentene and 1-octene, and more preferably 1-hexene, 4-methyl-1-pentene and 1-octene, and most preferably 1-octene.

The amount of the ethylene/α-olefin interpolymer used in the polyethylene compositions of the present invention will depend upon the desired physical properties of the resultant composition, and the amount of functionalized polyethylene included in the composition. However, typically, the inventive compositions will comprise at least about 5 weight percent, preferably at least about 10 weight percent of the homogeneous ethylene/α-olefin interpolymer. Typically, the inventive compositions will comprise no more than about 70 weight percent, preferably no more than about 50 weight percent, and more preferably no more than about 30 weight percent of the homogeneous ethylene/α-olefin interpolymer.

The inventive polyethylene compositions of the present invention comprise filler. The type of filler employed will be selected on the basis of the desired physical properties of the final product. Exemplary fillers include calcium carbonate, barium sulfate, barite, glass fiber and powder, metal powder, alumina, hydrated alumina, clay, magnesium carbonate, calcium sulfate, silica or glass, fumed silica, talc, carbon black or graphite, fly ash, cement dust, feldspar, nepheline, magnesium oxide, zinc oxide, aluminum silicate, calcium silicate, titanium dioxide, titanates, glass microspheres, chalk, and mixtures thereof. Preferred fillers are calcium carbonate, barium sulfate, talc, silica/glass, alumina, and titanium dioxide, and mixtures thereof. The most preferred filler is calcium carbonate, which is available in the industry as limestone and rockdust.

Likewise, the filler may belong to the class of fillers known as ignition resistance fillers. Exemplary ignition resistant fillers include antimony oxide, decabromobiphenyl oxide, alumina trihydrate, magnesium hydroxide, borates, and halogenated compounds. Of these ignition resistant fillers, alumina trihydrate and magnesium hydroxide are preferred.

Other miscellaneous fillers include wood fibers/flours/chips, ground rice hulls, cotton, starch, glass fibers, synthetic fibers (e.g., polyolefin fibers), and carbon fibers.

The amount of filler present in the polyethylene compositions of the present invention will be selected based upon the requirement of final application. Typically, the polyethylene compositions of the invention will comprise at least about 30 weight percent, preferably at least about 50 weight percent, more preferably at least about 70 weight percent, and most preferably greater than 75 weight percent filler. Typically, the polyethylene compositions of the invention will comprise no more than about 95 weight percent, preferably no more than about 90 weight percent filler. The polyethylene compositions of the present invention withstand such high filler levels without suffering a corresponding sacrifice of physical properties.

The polyethylene composition of the present invention further comprises at least one functionalized polyethylene. The term "functionalized polyethylene" herein means a polyethylene incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene homopolymer or an ethylene/α-olefin interpolymer, or it may be copolymerized with ethylene and an optional additional comonomer to form an interpolymer of ethylene, the functional comonomer and optionally other comonomer(s).

Generally, examples of such functionalized polyethylene may include: copolymers of ethylene and ethylenically unsaturated carboxylic acid such as acrylic acid and methacrylic acid; copolymers of ethylene and esters of carboxylic acid such as vinyl acetate; polyethylene grafted with an unsaturated carboxylic acid or a carboxylic acid anhydride, such as maleic anhydride. Specific examples of such functionalized polyethylene may include, ethylene/vinyl acetate copolymer (EVA), ethylene/acrylic acid copolymer (EAA), ethylene/methacrylic acid copolymer (EMAA), salts therefrom(ionomer), various polyethylene grafted with maleic anhydride (MAH) such as MAH-grafted high pressurelow density polyethylene, heterogeneously branched linear ethylene/α-olefin interpolymers (which have commonly been referred to as linear low density polyethylene and ultralow desity polyethylene), homogeneously branched linear ethylene/α-olefin interpolymers, substantially linear ethylene/α-olefin interpolymers, and HDPE. Means for grafting functional groups onto polyethylene are described for example in U.S. Pat. Nos. 4,762,890, 4,927,888, or 4,950,541, the disclosures of each of which is incorporated herein by reference.

Two preferred functionalized polyethylenes preferably used to form the compositions of present invention are ethylene/acrylic acid copolymers and maleic anhydride grafted polyethylene. More preferred functionalized polyethylenes are ethylene/acrylic acid copolymers, maleic anhydride-grafted substantially linear ethylene/α-olefin interpolymers, and maleic anhydride-grafted high density polyethylene.

The amount of the functional group present in the functional polyethylene will vary. Typically, the functional group will be present in a graft-type functionalized polyethylene (e.g., the maleic anhydride content in a maleic anhydride-grafted polyethylene) at a level which is preferably at least about 0.1 weight percent, more preferably at least about 0.5 weight percent. The functional group will typically be present in a graft-type functionalized polyethylene in an amount less than about 10 weight percent, more preferably less than about 5 weight percent, and most preferably less than about 3 weight percent. In contrast, the functional group will typically be present in a copolymer-type functionalized polyethylene (e.g., the acrylic acid content in an ethylene acrylic acid copolymer) will be at least about 1.0 weight percent, preferably at least about 5 weight percent, and more preferably at least about 7 weight percent. The functional group will typically be present in a copolymer-type functionalized polyethylene in an amount less than about 40 weight percent, preferably less than about 30 weight percent, and more preferably less than about 25 weight percent.

The melt index ($I_2$) of the functionalized polyethylene may be varied, except to the extent to which it unacceptably affects processability of the inventive composition and physical properties of final product. Generally, the functionalized polyethylene has a melt index of at least about 0.1 g/10 min., preferably at least about 0.2 g/10 min. Generally, the functionalized polyethylene has a melt index of no more than about 500 g/10 min., more preferably no more than about 350 g/10 min.

The functionalized polyethylene will typically be present in the polyethylene composition of the invention in an amount of at least about 0.1 weight percent, preferably at least about 0.5 weight percent, and more preferably at least about 1.0 weight percent. The functionalized polyethylene will typically be present in the polyethylene composition of the invention in an amount of no more than about 10 weight percent, preferably no more than about 5 weight percent, and most preferably no more than about 3 weight percent.

The polyethylene composition of the present invention may comprise any known additives, to the extent that they do not interfere with the enhanced formulation properties discovered by the applicants. Any additives commonly employed in polyolefin compositions, for example, cross-linking agents, antioxidants (e.g., calcium stearates, hindered phenolics such as Irganox™ 1010 made by Ciba Geigy Corp., phosphites such as Irgafos™ 168, also by Ciba Geigy Corp.), flame retardants, heat stabilizers, ultra-violet absorbents, anti-static agents, slip agents, tackifiers, waxes, oils, process aids, foaming agents, dyes, pigments and the like may be included in the composition. Preferred additives include, for example, calcium stearate, Irgafos™ 168 and Irganox™ 1010.

The polyethylene compositions of the present invention may be formed by any convenient method, such as blending the individual components and subsequently melt mixing, or by pre-melt mixing in a separate extruder (e.g. a Banbary mixer, a Haake mixer, a Brabender internal mixer, or a twin screw extruder).

The polyethylene compositions of the present invention may be readily formed into the desired shape by using any apparatus commonly available in the industry. For example, the polyethylene composition may be fed to an apparatus for the manufacture of articles, employing such unit operations as compression molding, injection molding, sheet extrusion, band pressing, roll milling, and/or calendering, to produce sheeting or tile structures.

EXAMPLES

The following examples are for illustrative purposes only and they should not be taken as limiting the scope of either the specification or the claims. Unless otherwise stated, all percentages and parts are by weight.

The polymer components indicated in Table 1 are used in the Examples.

TABLE 1

| Material | Type | Melt Index (g/10 min) | Density (g/cm³) | $I_{10}/I_2$ | Additives | Functionality |
|---|---|---|---|---|---|---|
| A | Substantially linear ethylene/octene copolymer | 1.0 | 0.902 | 9.0 | 1250 ppm CaSt/500 ppm Irganox 1076/800 ppm PEPQ | none |
| B | Substantially linear ethylene/octene copolymer | 1.0 | 0.885 | 7.5 | 1250 ppm CaSt/500 ppm Irganox 1076/800 ppm PEPQ | none |
| C | Substantially linear ethylene/octene copolymer | 1.0 | 0.871 | 7.6 | 1250 ppm CaSt/500 ppm Irganox 1076/800 ppm PEPQ | none |
| D | Substantially linear ethylene/octene copolymer | 6.0 | 0.900 | 7.5 | 1250 ppm CaSt/500 ppm Irganox 1076/800 ppm PEPQ | none |
| E | Substantially linear ethylene/octene copolymer | 4.0 | 0.880 | not available | 1250 ppm CaSt/500 ppm Irganox 1076/800 ppm PEPQ | none |
| F | Substantially linear ethylene/octene copolymer | 5.0 | 0.871 | 7.5 | 1250 ppm CaSt/500 ppm Irganox 1076/800 ppm PEPQ | none |

TABLE 1-continued

| Material | Type | Melt Index (g/10 min) | Density (g/cm$^3$) | $I_{10}/I_2$ | Additives | Functionality |
|---|---|---|---|---|---|---|
| G | Substantially linear ethylene/octene copolymer | 10.0 | 0.900 | not available | 1250 ppm CaSt/500 ppm Irganox 1076/800 ppm PEPQ | none |
| H | Substantially linear ethylene/octene copolymer | 10.0 | 0.871 | 7.0 | 800 ppm PEPQ | none |
| I | Maleic anhydride grafted linear high density ethylene/octene copolymer* | 2.5 | 0.955 | not applicable | | 1.0% maleic anhydride |
| J | Maleic anhydride grafted substantially linear ethylene/octene copolymer* | 0.4 | 0.871 | not applicable | 200 ppm Irganox 1010 | 1.0% maleic anhydride |
| K | Ethylene acrylic acid copolymer | 300 | 0.960 | not applicable | | 20% acrylic anhydride |
| L | Ethylene acrylic acid copolymer | 5 | 0.960 | not applicable | 200 ppm Irganox 1010 | 9.7% acrylic anhydride |

In Table I, CaSt refers to calcium stearate, Irganox 1076 is a hindered phenolic stabilizer available from Ciby Geigy, and PEPQ refers to tetrakis(2,4-di-t-butylphenyl)-4,4'-biphenylene diphosponite (available from Clariant Corporation).

In the case of sample I, the polymer was produced by grafting 1.2% maleic anhydride onto a linear high density polyethylene having a density of 0.955 g/cm$^3$, an $I_2$ of 25 g/10 min., and an $I_{10}/I_2$ of 6.5. In the case of sample J, the polymer was produced by grafting 1.2% maleic anhydride onto a substantially linear ethylene/octene copolymer having a density of 0.871 g/cm$^3$, an $I_2$ of 1 g/10 min., and a $I_{10}/I_2$ of 7.6.

Comparative Example 1

15 weight % of Polymer A, a copolymer of ethylene and octene-1 having a density of 0.902 g/cm$^3$, melt index ($I_2$) of 1.0 g/10 minutes, molecular weight distribution ($M_w/M_n$) of 2.0, and 85 weight % of CaCO$_3$ type filler (said filler comprising a blend of equal weight proportions of Pfizer ATF-40 Limestone and Georgia Marble Rockdust) is added to Banbury type mixer (Farrel Banbury BR mixer with a 1573 cm$^3$ chamber) and blended with operating the rotor at the rate that gives 300 to 350° F. (149 to 177° C.) chamber temperature for 2 minutes. The mixed material is then dropped out of the Banbury mixer, and is fed to roll mill having 6 inch (15 cm) diameter and 12 inch (30 cm) width set at surface temperature of 350° F. (177° C.). A sheet is either taken off after a 180° wrap or is allowed to wrap 540° before release. The sheet is then cut and compression molded into plaques having a thickness of 0.125 inch (0.318 cm), a width of 12 inches (30.5 cm) and a length of 12 inches by using hydraulic press manufactured by Pasadena Hydraulics Incorporated (PHI). The press is operated at 400° F. (204° C.) in a preheat mode at minimal pressure for 3 minutes, and is then pressured up to 15 tons for 2 minutes. Plaques are then removed from the heat and cooled at 15 tons for 3 minutes.

Tensile properties are measured according to ASTM D-638, Type C. Hardness Shore A and Shore D of the compression molded plaques is measured using a Hardness Tester in accordance with ASTM D-2240. The tensile properties and hardness data are summarized in Table 2.

A Mandrel Test is conducted for the compression molded plaques using the following procedure. The plaques are cut into strips having a width of 2 inches (5.1 cm) and a length of 6 inches (15.2 cm). The strips are bent over a succession of different diameter pipes, or mandrels, until the strip is broken. The diameter corresponding to the failure is recorded as the mandrel bend, or flexibility rating. Flexibility data is summarized in Table 2. In the table, "no" break means no break is experienced even upon at bending to 180°.

An indentation test is conducted on the strips using the following procedure. A 140 lbs (63.6 kg) weight is applied to the strips via a 0.178 inch diameter cylindrical foot, for 10 minutes, and the initial indentation is measured. The residual indentation is measured after 60 minutes. Indentation depths are measured to the nearest mil (0.001 inch). For residual indentation, the sample is given a fail rating if the cylindrical indent foot permanently cut and damaged the surface. The results are summarized in Table 2.

Comparative Examples 2 to 7

Substantially the same procedure as described with respect to Comparative Example 1 is repeated using copolymers of ethylene and octene having the melt indices and densities referenced in Table 1 and listed in Tables 2. The results are summarized in Table 2. These examples are for comparison and are not claimed.

TABLE 2

| Comp. Ex. No. | Formulation | Ult. Tens. (kg/cm$^2$) | Elong. (%) | Hardness (shore D) | Mandrel Bend Diameter (cm) | Initial Indent. (0.001 inch) | Residual Indent. (0.001 inch) |
|---|---|---|---|---|---|---|---|
| 1 | 15% A / 85% filler | 62.6 | 8 | 65 | 5.1 | 7 | 1 |
| 2 | 15% B / 85% filler | 23.6 | 220 | 50 | no | — | — |

TABLE 2-continued

| Comp. Ex. No. | Formulation | Ult. Tens. (kg/cm$^2$) | Elong. (%) | Hardness (shore D) | Mandrel Bend Diameter (cm) | Initial Indent. (0.001 inch) | Residual Indent. (0.001 inch) |
|---|---|---|---|---|---|---|---|
| 3 | 15% C / 85% filler | 14.8 | 700 | 43 | no | >125 | fail |
| 4 | 15% D / 85% filler | 38.7 | 14 | 59 | 2.5 | 13 | fail |
| 5 | 15% F / 85% filler | 14.5 | 400 | 43 | no | >125 | fail |
| 6 | 15% G / 85% filler | 31.6 | 10 | 61 | 1.3 | 16 | fail |
| 7 | 15% H / 85% filler | 47.1 | 15 | 45 | no | >125 | fail |

*Abbreviation (unit)
Comp. Ex. No.: Comparative Example Number
MI: Melt Index (g/10 minutes)
Dens: Density (g/cm$^3$)
Ult. Ten.: Ultimate Tensile Strength (kg/cm$^2$)
Elong.: Ultimate Elongation (%)
Initial Indent.: Initial Indentation (0.001 inch)
Residual Indent.: Residual Indentation (0.001 inch)

Examples 8–13

The procedure of Comparative Example 1 is substantially repeated, except that the 15% Polymer A used is replaced by a blend of 10 weight % of maleic anhydride (MAH) grafted high density linear polyethylene having originally, i.e. before grafting, a melt index (I$_2$) of 25 g/10 minutes, a density of 0.955 g/cm$^3$, and a maleic anhydride content of 1.0 weight % (based on the weight of the high density linear polyethylene), and 90 weight % of a substantially linear ethylene/1-octene copolymer having melt indices and densities referenced in Table 1 and listed in Table 3. The results are summarized in Table 3.

Example 15

The procedure of Example 1 is substantially repeated, except that the 15% Polymer A used is replaced by a blend of 20 weight % of a maleic anhydide-grafted substantially linear ethylene/1-octene copolymer (i.e., a substantially linear polyethylene) having originally, i.e. before grafting, a melt index (I$_2$) of 0.4 g/10 minutes, a density of 0.871 g/cm$^3$ and a maleic anhydride content of 1.0 weight %, and 80 weight % of a substantially linear ethylene/1-octene copolymer having the melt indices and densities referenced in Table 1 and listed in Table 3. The results are summarized in Table 3.

TABLE 3

| Ex. No. | Formulation | Ult. Tens (kg/cm$^2$) | Elong (%) | Hardness (shore D) | Mandrel Bend Diameter (cm) | Initial Indent. (0.001 inch) | Residual Indent. (0.001 inch) |
|---|---|---|---|---|---|---|---|
| 8 | 13.5% C/1.5% I/85% filler | 79.8 | 19 | 60 | 2.5 | 7 | 1 |
| 9 | 13.5% D/1.5% I/85% filler | 113.2 | 13 | 70 | 2.5 | 7 | 3 |
| 10 | 13.5% E/1.5% I/85% filler | 91.8 | 20 | 65 | 2.5 | 7 | 0 |
| 11 | 13.5% F/1.5% I/85% filler | 71.0 | 18 | 60 | 2.5 | 12 | 3 |
| 12 | 13.5% G/1.5% I/85% filler | 109.7 | 9 | 67 | 2.5 | 9 | 4 |
| 13 | 13.5% H/1.5% I/85% filler | 73.5 | 29 | 60 | 1.3 | 15 | fail |
| 14 | 12.0% H/3.0% I/85% filler | 81.6 | 45 | 60 | no | 12 | 3 |
| 15 | 12.0% H/3.0% J/85% filler | 68.9 | 73 | 59 | no | 12 | 4 |

*The abbreviations are the same as indicated in TABLE 1.

Example 14

The procedure of Example 1 is substantially repeated, except that the 15% Polymer A used is replaced by a blend of 20 weight % of a maleic anhydride-grafted high density linear polyethylene having originally, i.e. before grafting, a melt index (I$_2$) of 25 g/10 minutes, a density of 0.955 g/cm$^3$, and a maleic anhydride content of 1.0 weight % (based on the weight of the high density linear polyethylene), and 80 weight % of a substantially linear ethylene/1-octene copolymer having melt indices and densities referenced in Table 1 and listed in Table 3. The results are summarized in Table 3.

Examples 16 to 21

The procedure of Comparative Example 1 is substantially repeated except that the 15% Polymer A used is replaced with a blend of 10 weight % of maleic anhydride grafted substantially linear ethylene/1-octene copolymer having originally, i.e. before grafting, a melt index of 0.4 g/10 minutes, density of 0.871 g/cm$^3$ and maleic anhydride content of 1.0 weight %, and 90 weight % of copolymer of ethylene and octene having the melt indices and densities referenced in Table 1. The results are summarized in Table 4.

TABLE 4

| Ex. No. | Formulation | Ult. Tens (kg/cm²) | Elong (%) | Hardness (shore D) | Mandrel Bend Diameter (cm) | Initial Indent. (0.001 inch) | Residual Indent. (0.001 inch) |
|---|---|---|---|---|---|---|---|
| 16 | 13.5% A/1.5% J/85% filler | 116.4 | 14 | 71 | 2.5 | 3 | 1 |
| 17 | 13.5% C/1.5% J/85% filler | 71.0 | 33 | 58 | no | 6 | 1 |
| 18 | 13.5% D/1.5% J/85% filler | 112.5 | 14 | 71 | 2.5 | 3 | 0 |
| 19 | 13.5% F/1.5% J/85% filler | 64.3 | 45 | 59 | no | 15 | 3 |
| 20 | 13.5% G/1.5% J/85% filler | 86.5 | 8 | 67 | 5.1 | 4 | 1 |
| 21 | 13.5% H/1.5% J/85% filler | 59.1 | 23 | 58 | no | 18 | fail |

*The abbreviations are the same as indicated in TABLE 1.

Examples 22 to 33

The procedure of Example 1 is substantially repeated except that the blend is of a copolymer of ethylene and acrylic acid and copolymers of ethylene and octene having the melt indices and densities referenced in Table 1 and listed in Table 5, is used instead of the coplymer of ethylene and octene. The results are summarized in Table 5

TABLE 5

| Ex. No. | Formulation | Ult. Tens (kg/cm²) | Elong (%) | Hardness (shore D) | Mandrel Bend Diameter (cm) | Initial Indent. (0.001 inch) | Residual Indent. (0.001 inch) |
|---|---|---|---|---|---|---|---|
| 22 | 13.5% A/1.5% K/85% filler | 117.42 | 12 | 69 | 5.1 | 4 | 2 |
| 23 | 12.0% A/3.0% K/85% filler | 136.75 | 8 | 75 | 10.2 | 4 | 1 |
| 24 | 10.5% A/4.5% K/85% filler | 160.31 | 5 | 80 | 12.7 | 3 | 1 |
| 25 | 13.5% A/1.5% L/85% filler | 142.03 | 7 | 74 | 7.6 | 2 | 0 |
| 26 | 12.0% A/3.0% L/85% filler | 149.41 | 8 | 76 | 12.7 | 1 | 1 |
| 27 | 10.5% A/4.5% L/85% filler | 149.41 | 9 | 76 | 7.6 | 3 | 1 |
| 28 | 13.5% H/1.5% K/85% filler | 59.76 | 25 | 58 | 1.3 | 22 | failed |
| 29 | 12.0% H/3.0% K/85% filler | 113.20 | 4 | 74 | 12.7 | 3 | 2 |
| 30 | 10.5% H/4.5% K/85% filler | 113.20 | 5 | 77 | 12.7 | 0 | 0 |
| 31 | 13.5% H/1.5% L/85% filler | 61.87 | 19 | 59 | 1.3 | 28 | failed |
| 32 | 12.0% H/3.0% L/85% filler | 80.15 | 9 | 67 | 2.5 | 6 | 2 |
| 33 | 10.5% H/4.5% L/85% filler | 121.64 | 5 | 73 | 7.6 | 4 | 1 |

*The abbreviations are the same as indicated in TABLE 1.

As indicated above, the polyethylene compositions of the present invention performs superior physical properties such as tensile properties, indentation resistance, and filler holding capacity with simple formulation, making them particularly useful in flooring applications, especially floor tile and floor sheeting.

In particular, the above examples illustrate that the polyethylene compositions of the invention exhibit good filler holding, i.e., greater than 75 percent filler.

The polyethylene compositions of the invention further exhibit residual indentation values of below 20 mils, preferably less than 10 mils, more preferably less than 5 mils.

The polyethylene compositions of the invention further exhibit ultimate tensile strengths of above 50 kg/cm², preferably greater than 60 kg/cm², and most preferably greater than 100 kg/cm².

The polyethylene compositions of the invention further have good flexibility of a Mandrel bend diameter below 15 cm, preferably less than 10 cm, and more preferably less than 5 cm.

We claim:

1. A plasticizer-free polyethylene composition comprising:

(A) from about 5 weight percent to about 70 weight percent of at least one homogeneous ethylene/α-olefin interpolymer having:
  (i) a density from about 0.85 g/cm³ to about 0.92 g/cm³,
  (ii) a molecular weight distribution ($M_w/M_n$) of less than about 3.5,
  (iii) a melt index ($I_2$) of from about 0.1 grams/10 minutes to about 175 grams/10 minutes,
  (iv) a CDBI of greater than about 50 percent;
(B) from 30 weight percent to 95 weight percent of at least one filler; and
(C) from 0.1 weight percent to less than 10 weight percent of at least one functionalized polyethylene.

2. The polyethylene composition of claim 1 wherein the ethylene/α-olefin interpolymer is a substantially linear ethylene polymer.

3. The polyethylene composition of claim 1 wherein the ethylene/α-olefin is further characterized as having an $I_{10}/I_2$ of from about 7 to about 16.

4. The polyethylene composition of claim 1 wherein the ethylene/α-olefin interpolymer is a copolymer of ethylene and a $C_3$–$C_{10}$ α-olefin.

5. The polyethylene composition of claim 1 wherein the ethylene/α-olefin interpolymer is a copolymer of ethylene and 1-octene.

6. The polyethylene composition of claim 1 wherein the functionalized polyethylene is a polyethylene modified by grafting thereto an unsaturated carboxylic acid or an unsaturated carboxylic acid anhydride.

7. The polyethylene composition of claim 1 wherein the functionalized polyethylene is a homopolymer of ethylene modified by grafting thereto an unsaturated carboxylic acid or an saturated carboxylic acid anhydride.

8. The polyethylene composition of claim 1 wherein the functionalized polyethylene is copolymer of ethylene and $C_3$–$C_{20}$ α-olefin modified by grafting thereto an unsaturated carboxylic acid or an unsaturated carboxylic acid anhydride.

9. The polyethylene composition of claim 1 wherein the functionalized polyethylene is a substantially linear ethylene polymer modified by grafting thereto an unsaturated carboxylic acid or an unsaturated carboxylic acid anhydride.

10. The polyethylene composition of claim 1 wherein the functionalized polyethylene is a substantially linear copolymer of ethylene and 1-octene modified by grafting thereto maleic acid or maleic anhydride.

11. The polyethylene composition of claim 1 wherein the functionalized polyethylene is a copolymer of ethylene and a comonomer selected from a group consisting of unsaturated carboxylic acids and salts and esters thereof.

12. A floor structure comprising a polyethylene composition, wherein the polyethylene composition further comprises:
   (A) from about 5 weight percent to about 70 weight percent of at least one interpolymer of an ethylene and α-olefin having:
     (i) a density from 0.85 g/cm$^3$ to 0.92 g/cm$^3$,
     (ii) a molecular weight distribution ($M_w/M_n$) less than 3.5,
     (iii) a melt index from 0.1 grams/10 minutes to about 175 grams/10 minutes,
     (iv) a CDBI of greater than 50 percent;
   (B) from 30 weight percent to 95 weight percent of at least one filler; and
   (C) from 0.1 weight percent to less than 10 weight percent of at least one functionalized polyethylene selected from the group consisting of functionalized heterogeneously branched linear polyethylene, functionalized ethylene homopolymer, functionalized homogeneously branched linear polyethylene, functionalized substantially linear polyethylene, and ethylene/unsaturated carboxylic acid interpolymers.

13. The floor structure of claim 12, wherein the floor structure is in the form of a tile.

14. The floor structure of claim 12, wherein the floor structure is in the form of a sheet.

15. A plasticizer-free polyethylene composition comprising:
   (A) from about 5 weight percent to about 70 weight percent of at least one homogeneous ethylene/α-olefin interpolymer having:
     (i) a density from about 0.85 g/cm$^3$ to about 0.92 g/cm$^3$,
     (ii) a molecular weight distribution ($M_w/M_n$) of less than about 3.5,
     (iii) a melt index ($I_2$) of from about 0.1 grams/10 minutes to about 175 grams/10 minutes,
     (iv) a CDBI of greater than about 50 percent;
   (B) from 30 weight percent to 95 weight percent of at least one filler; and
   (C) from 0.1 weight percent to no more than about 5 weight percent of at least one functionalized polyethylene.

16. A plasticizer-free polyethylene composition comprising:
   (A) from about 5 weight percent to about 70 weight percent of at least one homogeneous ethylene/α-olefin interpolymer having:
     (i) a density from about 0.85 g/cm$^3$ to about 0.92 g/cm$^3$,
     (ii) a molecular weight distribution ($M_w/M_n$) of less than about 3.5,
     (iii) a melt index ($I_2$) of from about 0.1 grams/10 minutes to about 175 grams/10 minutes,
     (iv) a CDBI of greater than about 50 percent;
   (B) from 50 weight percent to 95 weight percent of at least one filler; and
   (C) from 0.1 weight percent to less than 10 weight percent of at least one functionalized polyethylene.

17. The plasticizer-free polyethylene composition of claim 16, wherein the functionalized polymer is provided in a amount which is no more than about 5 weight percent of the composition.

18. The plasticizer-free polyethylene composition of claim 17, wherein the functionalized polymer is an ethylene/acrylic acid copolymer or a maleic anhydride grafted polyethylene.

19. The plasticizer-free polyethylene composition of claim 17, in the form of a article manufactured by compression molding, injection molding, sheet extrusion, band pressing, roll milling, and/or calendering.

20. The plasticizer-free polyethylene composition of claim 17 in the form of a sheeting or tile structure.

21. The floor structure of claim 12, wherein the polyethylene composition is fed to an apparatus employing one or more unit operations selected from the group consisting of compression molding, injection molding, sheet extrusion, band pressing, roll milling and calendering.

* * * * *